United States Patent [19]

Nepsund et al.

[11] Patent Number: 5,858,044

[45] Date of Patent: *Jan. 12, 1999

[54] FILTER ARRANGEMENT INCLUDING REMOVABLE FILTER WITH FIRST AND SECOND MEDIA SECURED TOGETHER

[75] Inventors: Larry R. Nepsund, Savage; Kathleen A. Abrahamson, Prior Lake; Thomas A. Boeckermann, Lakeville; James K. Elfstrand, Mounds View, all of Minn.

[73] Assignee: Donaldson Company, Inc., Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 678,301

[22] Filed: Jul. 11, 1996

[51] Int. Cl.$^6$ ...................................................... B01D 29/58
[52] U.S. Cl. .................................. 55/486; 55/496; 55/498
[58] Field of Search ............................... 55/498, 511, 497, 55/486, 487, 485, 483, 496, DIG. 31, 482

[56] References Cited

U.S. PATENT DOCUMENTS 1,743,675  1/1930  Jordahl .
1,771,639  7/1930  Jordahl .
2,174,528  10/1939  Prentiss .

(List continued on next page.)

FOREIGN PATENT DOCUMENTS 0 001 407  4/1979  European Pat. Off. .
0 053 879  6/1982  European Pat. Off. .
0 083 789  7/1983  European Pat. Off. .

(List continued on next page.)

OTHER PUBLICATIONS

"*Experimental Study of Nonwoven Filter Performance Using Second Filter Orthogonal Design*", T. Jardszczyk, Corporate Research Department, Nelson Industries, Inc., Copyright 1987 by Hemisphere Publishing Corporation.

"*New Concepts in Process Design for Micro–Fibers by MFLT–Blowing*", Eckhard C.A. Schwartz, Biax–Fiberfilm Corporatiom, TAPPI Seminar Notes.

"*Ashrae Standard, Method of Testing Air–Cleaning Devices Used in General Ventilation for Removing Particulate Matter*", The American Society of Heating, Refrigerating, and Air–Conditioning Engineers, Inc., Copyright 1979.

"*Nonwovens in Filtration/Separation*", paper presented by Clarke A. Rodman and Edward C. Homonoff, Allied Aftermarket Division, Allied Signal Corporation, Nonwoven Fabric Forum, Jun. 21–23, 1988, Clemson University, Clemson, S.C.

*Standard Test Method for Determining the Initial Efficiency of a Flatsheet Filter Medium in an Airflow Using Latex Spheres,* American Society for Testing and Materials, reprinted from the Annual Book of ASTM Standards, Copyright 1989, ASTM.

1989 SAE Handbook, vol. 3, Engines, Fuels, Lubricants, Emissions & Noise.

Material Safety Data Sheet for Silica Dust.

(List continued on next page.)

Primary Examiner—Jay H. Woo
Assistant Examiner—Robert Hopkins
Attorney, Agent, or Firm—Merchant, Gould, Smith, Edell, Welter & Schmidt, P.A.

[57] ABSTRACT

A filter arrangement is provided. The filter arrangement generally includes an air filter having an upstream surface with a prefilter positioned thereon. The prefilter preferably includes at least two layers of depth media. In preferred systems, the prefilter includes two layers of depth media secured to one another by stitching. In certain preferred arrangements disclosed, the prefilter includes an upstream layer of fibrous depth media and a downstream layer of foam depth media, with the two layers stitched to one another along peripheral edges. The invention also concerns provision of prefilters, and also air filter arrangements which include housings having air filters with prefilters according to the present invention operably positioned therein. Methods of construction and use are also provided.

13 Claims, 10 Drawing Sheets

U.S. PATENT DOCUMENTS

| | | |
|---|---|---|
| 2,334,840 | 11/1943 | Punton et al. . |
| 2,413,769 | 1/1947 | Kasten . |
| 2,450,363 | 9/1948 | Slayter et al. . |
| 2,598,673 | 6/1952 | Brixius et al. . |
| 2,918,138 | 12/1959 | Lewis . |
| 2,966,960 | 1/1961 | Rochlin . |
| 3,073,735 | 1/1963 | Till et al. . |
| 3,231,639 | 1/1966 | Mabru . |
| 3,290,870 | 12/1966 | Jensen ............... 55/502 |
| 3,298,149 | 1/1967 | Sobeck . |
| 3,384,241 | 5/1968 | Nostrand . |
| 3,386,583 | 6/1968 | Merten . |
| 3,388,202 | 6/1968 | Opferkuch et al. . |
| 3,400,520 | 9/1968 | Sakurai . |
| 3,417,870 | 12/1968 | Bray . |
| 3,488,928 | 1/1970 | Tarala . |
| 3,552,553 | 1/1971 | Reading . |
| 3,672,130 | 6/1972 | Sullivan et al. . |
| 3,680,659 | 8/1972 | Kasten . |
| 3,698,161 | 10/1972 | Brixius et al. ............. 55/493 |
| 3,727,769 | 4/1973 | Scholl . |
| 3,766,629 | 10/1973 | Lechtenberg . |
| 3,802,160 | 4/1974 | Foltz ............... 55/187 |
| 3,822,531 | 7/1974 | Wisnewski et al. . |
| 3,837,995 | 9/1974 | Floden . |
| 3,878,014 | 4/1975 | Melead . |
| 3,918,945 | 11/1975 | Holloway et al. . |
| 3,990,333 | 11/1976 | Davis . |
| 3,994,258 | 11/1976 | Simm . |
| 4,011,067 | 3/1977 | Carey, Jr. . |
| 4,012,211 | 3/1977 | Goetz . |
| 4,025,598 | 5/1977 | Sasshofer et al. . |
| 4,069,026 | 1/1978 | Simm et al. . |
| 4,073,850 | 2/1978 | Brackmann et al. . |
| 4,074,985 | 2/1978 | Willas . |
| 4,086,070 | 4/1978 | Argo et al. . |
| 4,089,783 | 5/1978 | Holyoak . |
| 4,093,437 | 6/1978 | Ichihara et al. . |
| 4,099,943 | 7/1978 | Fischman et al. ............ 55/487 |
| 4,101,423 | 7/1978 | Merrill et al. . |
| 4,102,785 | 7/1978 | Head et al. . |
| 4,104,170 | 8/1978 | Nedza . |
| 4,143,196 | 3/1979 | Simm et al. . |
| 4,160,684 | 7/1979 | Berger, Jr. et al. . |
| 4,181,514 | 1/1980 | Lefkowitz et al. . |
| 4,188,197 | 2/1980 | Amberkar et al. . |
| 4,196,245 | 4/1980 | Kitson et al. . |
| 4,211,543 | 7/1980 | Tokar et al. . |
| 4,233,042 | 11/1980 | Tao . |
| 4,243,397 | 1/1981 | Tokar et al. . |
| 4,259,096 | 3/1981 | Nakamura et al. . |
| 4,288,503 | 9/1981 | Goldberg et al. . |
| 4,314,832 | 2/1982 | Fox . |
| 4,322,230 | 3/1982 | Schoen et al. . |
| 4,324,574 | 4/1982 | Fagan . |
| 4,350,592 | 9/1982 | Kronsbein . |
| 4,370,289 | 1/1983 | Sorenson . |
| 4,402,830 | 9/1983 | Pall . |
| 4,436,780 | 3/1984 | Hotchkiss et al. . |
| 4,452,619 | 6/1984 | Wright et al. . |
| 4,536,440 | 8/1985 | Berg . |
| 4,540,625 | 9/1985 | Sherwood . |
| 4,594,162 | 6/1986 | Berger . |
| 4,619,674 | 10/1986 | Erdmannsdorfer . |
| 4,629,483 | 12/1986 | Stanton . |
| 4,631,077 | 12/1986 | Spicer et al. ............ 55/487 |
| 4,647,373 | 3/1987 | Tokar et al. . |
| 4,650,506 | 3/1987 | Barris . |
| 4,676,807 | 6/1987 | Miller et al. . |
| 4,695,300 | 9/1987 | Takagi . |
| 4,701,197 | 10/1987 | Thornton et al. ............ 55/487 |
| 4,714,647 | 12/1987 | Shipp, Jr. et al. . |
| 4,720,292 | 1/1988 | Engel et al. . |
| 4,728,349 | 3/1988 | Oshitari . |
| 4,749,390 | 6/1988 | Burnett et al. ............ 55/316 |
| 4,758,460 | 7/1988 | Spicer et al. . |
| 4,759,782 | 7/1988 | Miller et al. . |
| 4,765,812 | 8/1988 | Homonoff et al. . |
| 4,783,271 | 11/1988 | Silverwater . |
| 4,842,739 | 6/1989 | Tang ............... 210/489 |
| 4,878,929 | 11/1989 | Tofsland et al. . |
| 4,881,957 | 11/1989 | Shofner ............... 55/97 |
| 4,886,599 | 12/1989 | Bachmann et al. . |
| 4,917,714 | 4/1990 | Kinsley, Jr. . |
| 4,976,759 | 12/1990 | Foltz . |
| 5,082,476 | 1/1992 | Kahbaugh et al. . |
| 5,084,178 | 1/1992 | Miller et al. . |
| 5,102,436 | 4/1992 | Grabowski ............... 55/487 |
| 5,108,474 | 4/1992 | Riedy et al. . |
| 5,122,270 | 6/1992 | Ruger et al. . |
| 5,129,923 | 7/1992 | Hunter et al. . |
| 5,154,742 | 10/1992 | Gault et al. . |
| 5,171,342 | 12/1992 | Trefz . |
| 5,238,474 | 8/1993 | Kahlbaugh et al. ............ 55/320 |
| 5,252,207 | 10/1993 | Miller et al. . |
| 5,279,731 | 1/1994 | Cook et al. . |
| 5,283,106 | 2/1994 | Seiler et al. . |
| 5,290,330 | 3/1994 | Tepper et al. . |
| 5,306,321 | 4/1994 | Osendorf . |
| 5,350,443 | 9/1994 | von Blucher et al. . |
| 5,350,513 | 9/1994 | Markowitz ............... 210/264 |
| 5,364,456 | 11/1994 | Kahlbaugh et al. . |
| 5,415,676 | 5/1995 | Tokar et al. . |
| 5,423,892 | 6/1995 | Kahlbaugh et al. . |
| 5,454,858 | 10/1995 | Tokar et al. . |
| 5,468,382 | 11/1995 | Cook et al. ............ 210/232 |
| 5,476,585 | 12/1995 | Mills . |

FOREIGN PATENT DOCUMENTS

| | | |
|---|---|---|
| 0 181 716 A2 | 5/1986 | European Pat. Off. . |
| 0 208 515 | 1/1987 | European Pat. Off. . |
| 0 212 082 | 3/1987 | European Pat. Off. . |
| 0 347 188 | 6/1989 | European Pat. Off. ............ 29/6 |
| 0 347 188 | 12/1989 | European Pat. Off. . |
| 0 503 449 A1 | 9/1992 | European Pat. Off. . |
| 2.214.505 | 8/1974 | France . |
| 2237667 | 2/1975 | France ............... 55/487 |
| 2 380 058 | 2/1978 | France . |
| DE 34 44 387 A1 | 7/1985 | Germany . |
| DE 35 13 062 A1 | 10/1986 | Germany . |
| 4107642 A | 9/1992 | Germany . |
| 630886 | 12/1961 | Italy . |
| 900450 | 7/1962 | United Kingdom . |
| 909894 | 11/1962 | United Kingdom . |
| 1401231 | 7/1975 | United Kingdom . |
| 1460925 | 1/1977 | United Kingdom . |
| 2101902 | 1/1983 | United Kingdom . |
| 2 152 399 | 8/1985 | United Kingdom . |
| 2 197 802 | 6/1988 | United Kingdom . |
| WO 84/0345 | 9/1984 | WIPO . |
| WO 8907484 | 8/1989 | WIPO . |
| WO 92/06767 | 4/1992 | WIPO . |

OTHER PUBLICATIONS

Brochure entitled "Torit Mist Collectors", Donaldson Company, Inc., Copyright May 1984.

Brochure entitled "Introducing the New Downsized Torit Downflo Dust Collector", Copyright 1994.

Brochure entitled "Introducing X–845, Scotchban Chemistry Takes on a New Element", 3M, Copyright 1991.

U.S. Patent Application Serial No. 07/560,723, entitled "Filter Insert for Air Filters Used in a Dust–Filled Environment", Jul. 31, 1990.

FILTER ARRANGEMENT INCLUDING REMOVABLE FILTER WITH FIRST AND SECOND MEDIA SECURED TOGETHER

FIELD OF THE INVENTION

The present invention relates to filter arrangements. It particularly concerns filter elements with prefilters. The invention also concerns methods of assembly and use.

BACKGROUND OF THE INVENTION

Air intake streams to engines for motorized vehicles, power generation equipment and similar equipment generally need to be filtered, for protection of the engine equipment from particulates carried in the air streams. In general, air filter arrangements are utilized upstream of the engine, with respect to air flow, for such filtering.

In some systems it is desirable to remove particulate material from air flow streams for other reasons, such as aesthetics or personal health and comfort. For example, cabin air filter systems for vehicles such as large agricultural tractors, mobile homes and automobiles, serve this purpose.

In general, principal areas of design focus with respect to such filter arrangements include: accommodating space limitations; achieving desired levels of filtering efficiency; and, obtaining preferred lifetime of use. It is generally desirable to provide for relatively long life or extended life filter arrangements, so that frequent removal and replacement of filter elements is avoided. However, it is generally preferred to obtain that long life without substantial loss of efficiency.

SUMMARY OF THE INVENTION

According to one aspect of the present invention, a filter arrangement is provided. The filter arrangement generally includes an air filter with a most upstream filter surface. A prefilter is positioned in covering relation to the upstream filter surface. The prefilter comprises at least two layers of filter media. Preferably, one of the layers of filter media in the prefilter comprises fibrous depth media; and, a second one of the layers of filter media comprises a layer of foam depth media. In certain preferred constructions, the air filter has first and second opposite end caps. In certain embodiments, preferably the prefilter comprises a filter construction circumscribing the air filter, in covering relation to an outer surface or periphery thereof. In some applications the first and second end caps are arranged in a circular configuration; and, the air filter is generally cylindrical.

Preferably, arrangements such as the ones described above include, as a prefilter, a strip of fibrous media secured to a strip of foam media by stitching. Such arrangements can generally be configured to be ring-shaped, with a transverse seam, for many applications.

In certain preferred arrangements, the layer of foam comprises a more downstream layer of the at least two layers of media, in the prefilter.

In some arrangements, the air filter includes a cylindrical pleated media construction. In many commercial systems, the air filter will be arranged with the media positioned between inner and outer liners, and in extension between first and second end caps. Typically, in such systems, the outer liner defines an outer filter surface or periphery for the air filter, which is located downstream from the prefilter. It is noted that there is no requirement of inner and outer liners, at least for certain advantages of the present invention to be obtained.

In some arrangements, the first end cap is an open end cap having an axial seal bead thereon; and, the second end cap is also an open end cap with an axial seal bead thereon. In some systems, the air filter will comprise a conventional filter construction, such as used in light trucks and other vehicles. In such constructions, in some instances the prefilter will be a new construction added to an otherwise conventional arrangement, for use. For example, such arrangements are quite usable with vehicle air filter constructions that are sized and arranged for a filtering airflow therethrough of at least 200–400 cubic feet per minute, during normally encountered operation under load (i.e. not at engine idle). At idle, of course, such systems would be encountering a relatively low air flow. In such arrangements, the air filter construction, without the prefilter thereon, is often circular (cylindrical) with an open, cylindrical interior. Such constructions typically have an inside diameter within a range of 4 inches to 14 inches (about 10–36 cm), and an outside diameter within the range of 5 inches to 25 inches (about 12 cm–64 cm).

Also, according to some applications of the present invention, a prefilter construction for positioning around the cylindrical air filter construction is provided. The typical and preferred prefilter construction generally comprises a layer of fibrous depth media and a layer of foam filter media, with the layer of foam media being secured to the layer of fibrous media by stitching. A circular or ring arrangement, with stitching along opposite edges, will be preferred. Also, the circular ring arrangement will generally be formed from a two layer strip which has been sewn into a circular ring, along a transverse seam, with stitching. Preferably no upstream or downstream liner is used on the prefilter. Of course an upstream liner on the air filter can be used to support the downstream side of the prefilter, in some embodiments.

In those preferred arrangements according to the present invention which include foam filter media, the foam filter media of the prefilter construction will comprise an open cell foam. Preferably it will comprise foam having at least 30 pores per inch (at least about 11 pores/cm). Typically it will not have a cell density of greater than about 80 pores per inch (32 pores/cm), for most applications. Preferably it has a cell density of about 50–55 pores per inch (19–22 pores/cm), and comprises a polyurethane foam. Also in such arrangements, the layer of fibrous depth media preferably comprises polyester fibers.

In certain preferred prefilter constructions, the layers of media will be positioned with the foam media comprising a more inner, downstream, layer; and, the layer of fibrous depth media comprising a more outer, upstream layer. The present most preferred prefilter arrangements have only those two layers. However, alternate constructions are possible.

In some arrangements, the outer layer of fibrous depth media includes a branded or embossed portion therein. The terms "branded" and "embossed" in this context refer to a portion of the fibrous media which has been compressed, typically with the application of heat, to permanently deform in selected areas to produce a selected indicia pattern thereat. The pattern will typically comprise a trademark for the arrangement, although other indicia may be used. The pattern may be formed, for example, as a single word, a phrase, a design indicia or logo, or various combinations thereof.

In some applications of the present invention, the filter arrangement generally comprises: (A) a downstream air filter including a first media construction, for example a pleated construction; and, (B) a prefilter including: (1) a layer of open cell foam media; and, (2) a layer of fibrous media. The prefilter is generally positioned upstream, relative to flow of air through the system, from the first media construction. Hereinabove, a preferred such arrangement utilized in conjunction with a circular cylindrical vehicle filter, was described. Other usable arrangements are possible. One example is panel filters, as shown in certain of the figures herein.

In general, in applications as engine air filters, filter arrangements according to the present invention were specifically designed to be efficient, convenient and effective for use with light vehicles having engine sizes of at least 1.2 liters, and typically 1.2 liters to 9 liters although the arrangement can be used in other contexts. With class 5–7 trucks, for example, the use will typically be with truck engines of 225 to 500 horsepower. The air filter arrangement typically comprises a housing having an air filter construction, generally as described herein, operably positioned within the housing, for use to filter air. In many applications, the housing will have a radial air inlet and an axial air outlet.

In the context of cabin air filters, filter arrangements according to the present invention were specifically designed to be efficient, convenient and effective for use with systems involving a typical air flow, through the cabin air filter, on the order of about 75 cubic feet/min. (cfm) to 300 cubic feet/min. (about 2–9 cubic meters/min.) Such cabin air filters are frequently used, for example, on automobiles, truck cabins and agricultural (farm) tractors.

Methods of preparing constructions and methods of use are also provided.

In the drawings, various embodiments of the present invention are depicted. It will be understood that in some instances relative material sizes and component thicknesses may be shown exaggerated, for clarity in understanding the invention. The embodiments depicted in the drawings are for purposes of example only. The techniques of the present invention may be applied in a wide variety of specific constructions.

BRIEF DESCRIPTION OF THE DRAWINGS

FIG. 6 being from a different side than FIG. 5.

in FIG. 7 indicia branded into the prefilter being depicted.

DETAILED DESCRIPTION

I. The Embodiment of FIGS. 1–8

The embodiment of FIGS. 1–8 may be used in a variety of systems. However, it was particularly developed for utilization in association with air intake systems for light vehicles, typically Class 5–7 trucks, or smaller vehicles such as automobiles. These will typically be class 5 trucks about the size of a one ton pickup down to passenger cars. Such vehicles generally have engines (4–8 cylinders) of about 1.2 liters–9 liters; and, under normal operation, with a typical engine load sufficient to move the vehicle, must filter air efficiently under engine intake airflow rates of at least 200–400 cubic feet per minute (about 5–11.5 cubic meters/ min.). By "under engine load" and similar terms, what is meant is under conditions in which the engine is being operated to move at least the vehicle (with its weight typically being at least 1,000 lbs.–2,000 lbs., i.e., about 454–910 kg), and not merely to idle. Conventional air filter arrangements for use in such systems generally include the utilization of pleated paper elements having a surface area, upstream side, of about 10 sq. ft. to 75 sq. ft., i.e., about 0.9 sq. m. to 7 sq. m. Typically such arrangements are configured in a generally cylindrical pattern, with an outside cylindrical periphery or surface area of about 90 sq. in. to 950 sq. in (about 580–6130 sq. cm), and with an outer diameter of about 5 in. to 25 in. (i.e., about 12 to 64 cm). From the descriptions it will be apparent that such systems must move a rather large amount of air efficiently, through a relatively small filter volume, for preferred filtering operation. Arrangements according to the present invention are specifically developed to enhance this operation in some applications. It is noted that the principles described can be utilized in a variety of other systems, however.

Before a detailed presentation is made of preferred materials for arrangements according to the present invention, and some theories regarding the principles of operation are presented, a general discussion will be made of various embodiments.

Example Embodiment—Circular Air Intake Filter

Attention is now directed to FIGS. 1–8, in which a first embodiment or arrangement according to the present invention is depicted.

Figure 1:
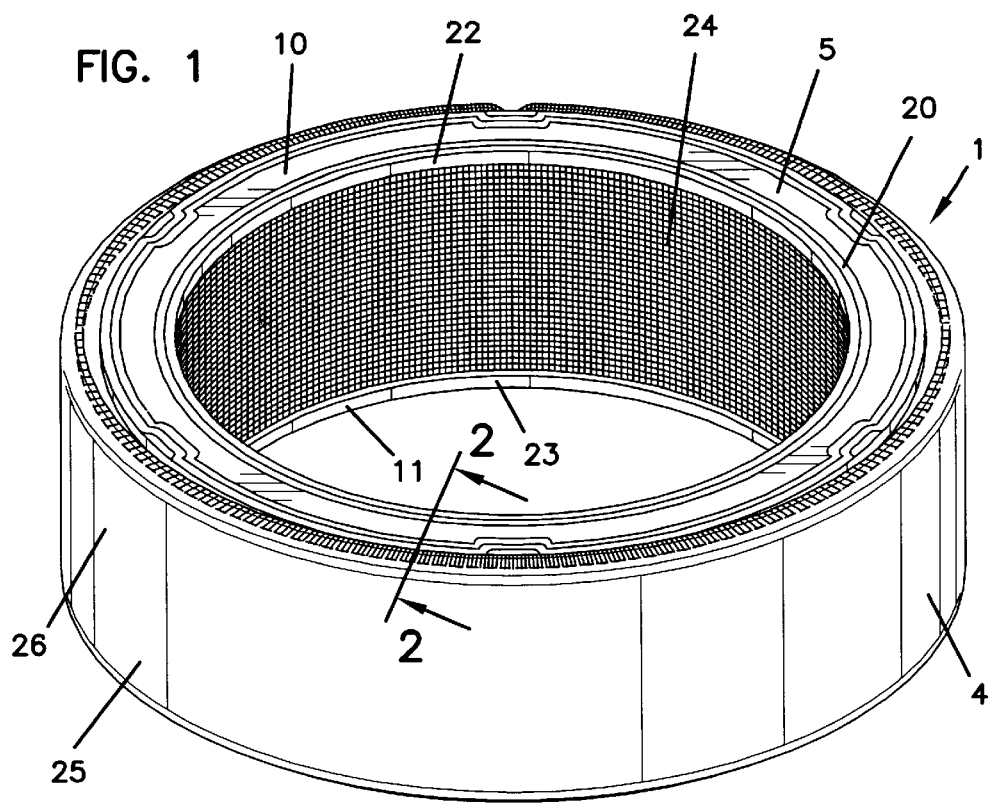
FIG. 1 is a perspective view of a filter element including a prefilter according to the present invention.

Referring to FIG. 1, reference numeral 1 generally depicts a filter arrangement according to the present invention. The filter arrangement 1 comprises two principal components: a prefilter 4; and, a primary or main air filter 5. In certain preferred embodiments, the prefilter 4 is removable from the primary air filter 5. That is, filter 4 is merely stretched or slipped around filter 5 and is not otherwise secured thereto in use. As will be understood, in preferred embodiments the prefilter 4 has a somewhat elastic character, and is sized to fit snugly around, and thus to circumscribe, filter 5.

Figure 2:
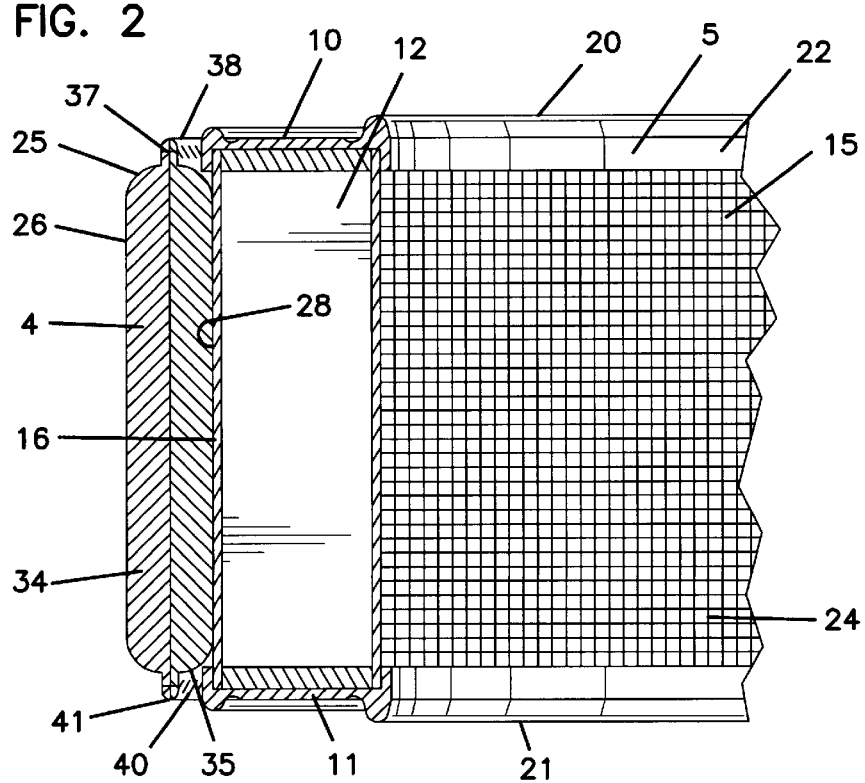
FIG. 2 is a fragmentary cross sectional view taken along line 2—2, FIG. 1.

For the arrangement shown in FIG. 1, filter 5 comprises a cylindrical air filter in a configuration well known for light vehicles. Filter 5 is generally circular in plan view; i.e., when viewed directly from the top or bottom. Referring to FIG. 2, air filter 5 includes first and second opposite end caps 10 and 11. In general, filter media 12 is partially imbedded in, and extends between, the end caps 10 and 11. In some preferred constructions, the media 12 will generally comprise cylindrically pleated media, for example surface loading pleated paper media, pleated synthetic media, or a pleated composite media. In other arrangements it may comprise depth media, or a combination of pleated surface loading media and depth media.

Referring to FIG. 2, the particular air filter 5 shown includes an inner liner 15 and an outer liner 16. The inner and outer liners 15 and 16 are partially imbedded in, and extend between, end caps 10 and 11. Each of liners 15 and 16 is open. For example, it may be perforated, expanded or woven as a mesh, to allow flow of air therethrough. The liners 15 and 16 generally border the media 12, in air filter 5, on downstream and upstream portions thereof, respectively. It is noted that there is no requirement for inner and outer liners in all arrangements according to the present invention. However, in many applications they are preferred, since they lend support to the structure and may facilitate assembly.

Referring to FIG. 1, end cap 10 generally includes a circular seal bead 20 thereon. An analogous seal bead 21, FIG. 2, is positioned on end cap 11. Indeed, in general, filter 5 for the arrangement shown in FIGS. 1–4 is symmetrical; i.e., end caps 10 and 11 are generally mirror images of one another; and, the filter 5 can be positioned in a housing, not shown in FIG. 4, with either one of the end caps (10, 11) positioned "up" or "out". For the arrangements depicted, seal heads 20, 21 are molded as part of the end caps 10, 11.

Figure 8:
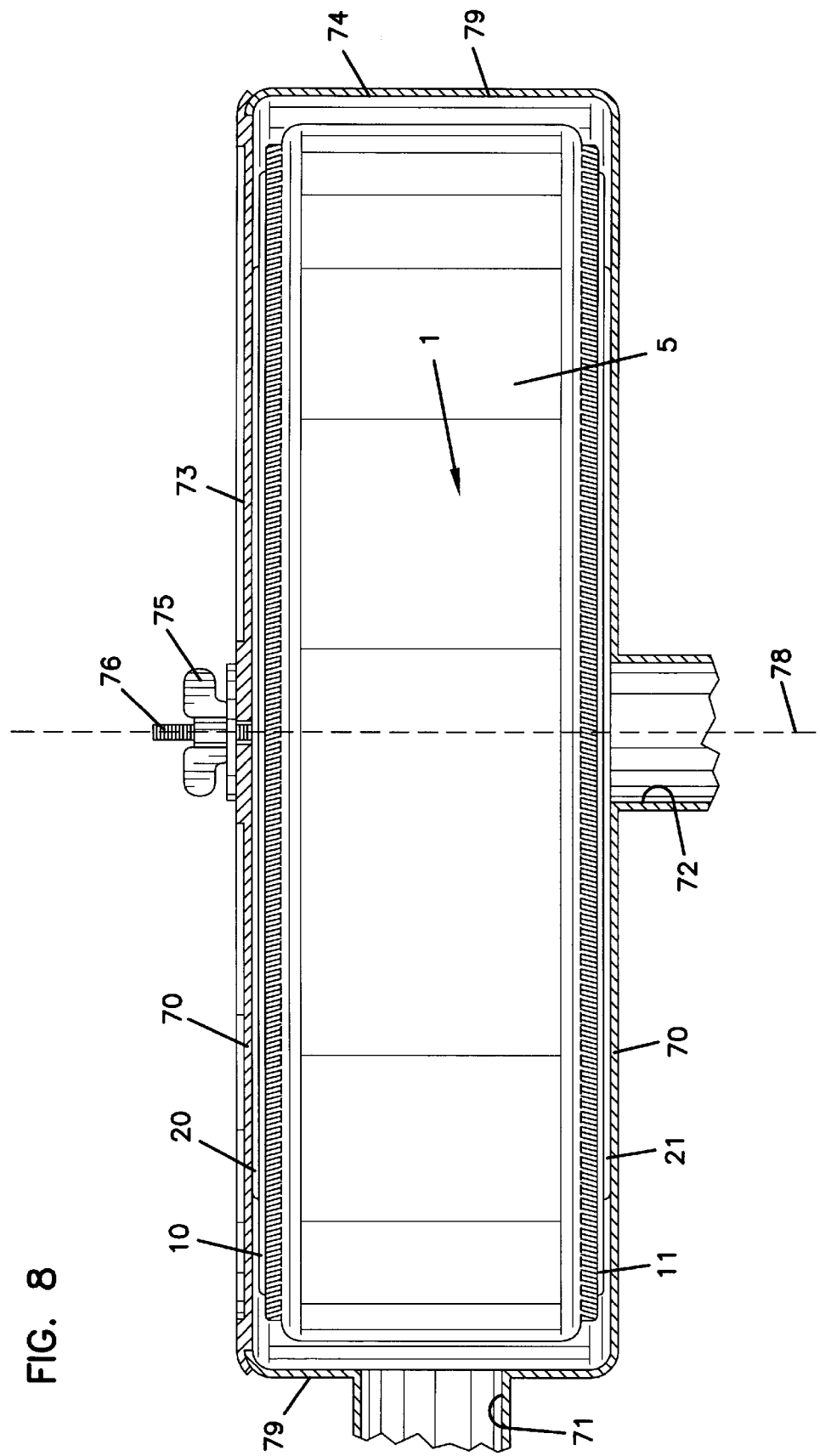
FIG. 8 is a side elevational view of an air filter arrangement according to the present invention shown positioned within a conventional housing; the housing depiction being schematic, fragmentary and in cross-section.

For the particular arrangement shown in FIGS. 1 and 2, end caps 10 and 11 are both "open" end caps. That is, each defines an inner aperture. In particular, end cap 10 defines inner aperture 22; and, end cap 11 defines inner aperture 23. The inner apertures (22, 23) permit air flow into or from the filter interior, unless the corresponding end cap (10, 11) is sealed against a closed surface. In typical operation, seal beads 20 and 21 are sealed against a portion of a housing, to prevent flow of unfiltered air through apertures 22 and 23. Typically, one or the other of apertures 22 and 23 will be sealed around an air outlet opening in a housing during use. The other of seal beads 20 and 21 will be sealed against a closed surface, typically a cover of the housing. Referring to FIGS. 1 and 2, in typical use, airflow will first be through prefilter 4, then through outer liner 16, media 12 and inner liner 15, and then into inner cylindrical space or volume 24 of air filter 5, as the air is filtered and then directed through the housing outlet. This will be further understood by reference to FIG. 8. In FIG. 8, the housing 70 includes a radially directed air inlet 71 and an axially directed air outlet 72. The housing 70 includes a cover 73 secured against sidewall 74 by wing nut 75 on center post 76. As the cover 73 is compressed downwardly under forces directed by the wing nut 75, it compresses seal bead 20 of end cap 10. The opposite seal bead 21 of end cap 11, is sealed around outlet opening 72 and against the housing 70. Thus, for the system of FIG. 8, the filter arrangement 1 is a removable and replaceable component in the housing 70.

Herein the term "radial" in combination with the description of the air inlet 71, refers to an air inlet that is generally directed toward a central longitudinal axis 78 of the arrangement; ie. in the direction of a radius around the central axis 78. The term "axial", in this context, is generally meant to refer to an air outlet 72 which directs flow of filtered air outwardly from a filter interior in a generally parallel direction to the central longitudinal axis 78. Housing systems which have radial inlets and axial outlets are well known in vehicles such as light trucks and automobiles. In such systems, the air filter construction is often oriented with central axis 78 extending generally vertically, when the vehicle is at rest on a flat surface.

It is noted that in some arrangements the air inlet is "tangential", i.e., it is oriented to direct air flow in a circular or helical pattern around the longitudinal axis. Principles according to the present invention may be applied in such systems.

Referring to FIG. 2, for the specific preferred arrangements shown, the inner liner 15 is generally an open mesh net such as a mesh galvanized steel (for example 180 expanded metal); and, the outer liner 16 is generally an expanded metal material such as galvanized steel, having an open area of at least 50% typically at least 70%. Of course, alternate materials could be used. For example, a nylon or similar screen material, such as is sometimes used in home window screens, is useable, in some instances, as the inner liner.

Figure 3:
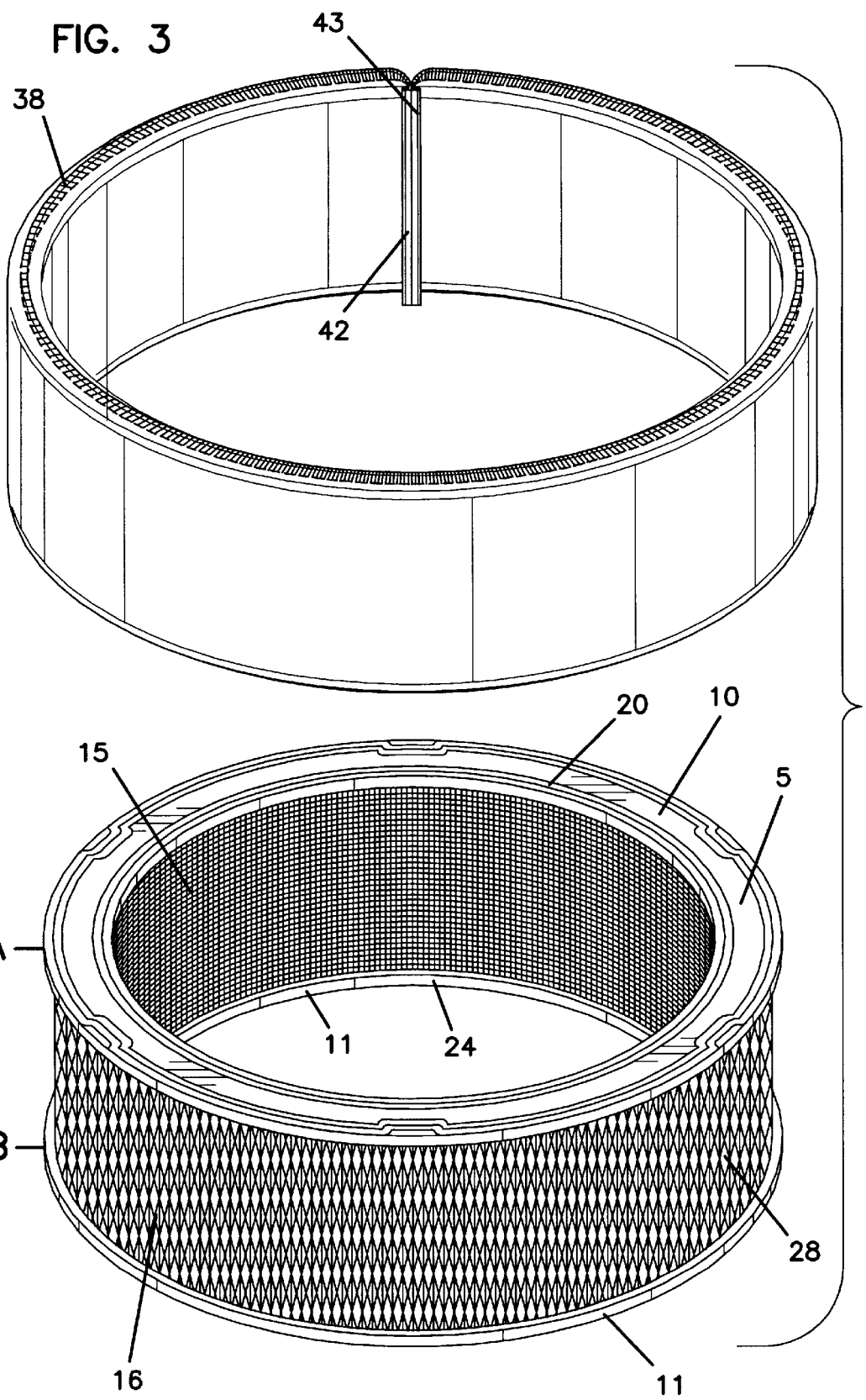
FIG. 3 is an exploded view of the arrangement shown in FIG. 1.
Figure 4:
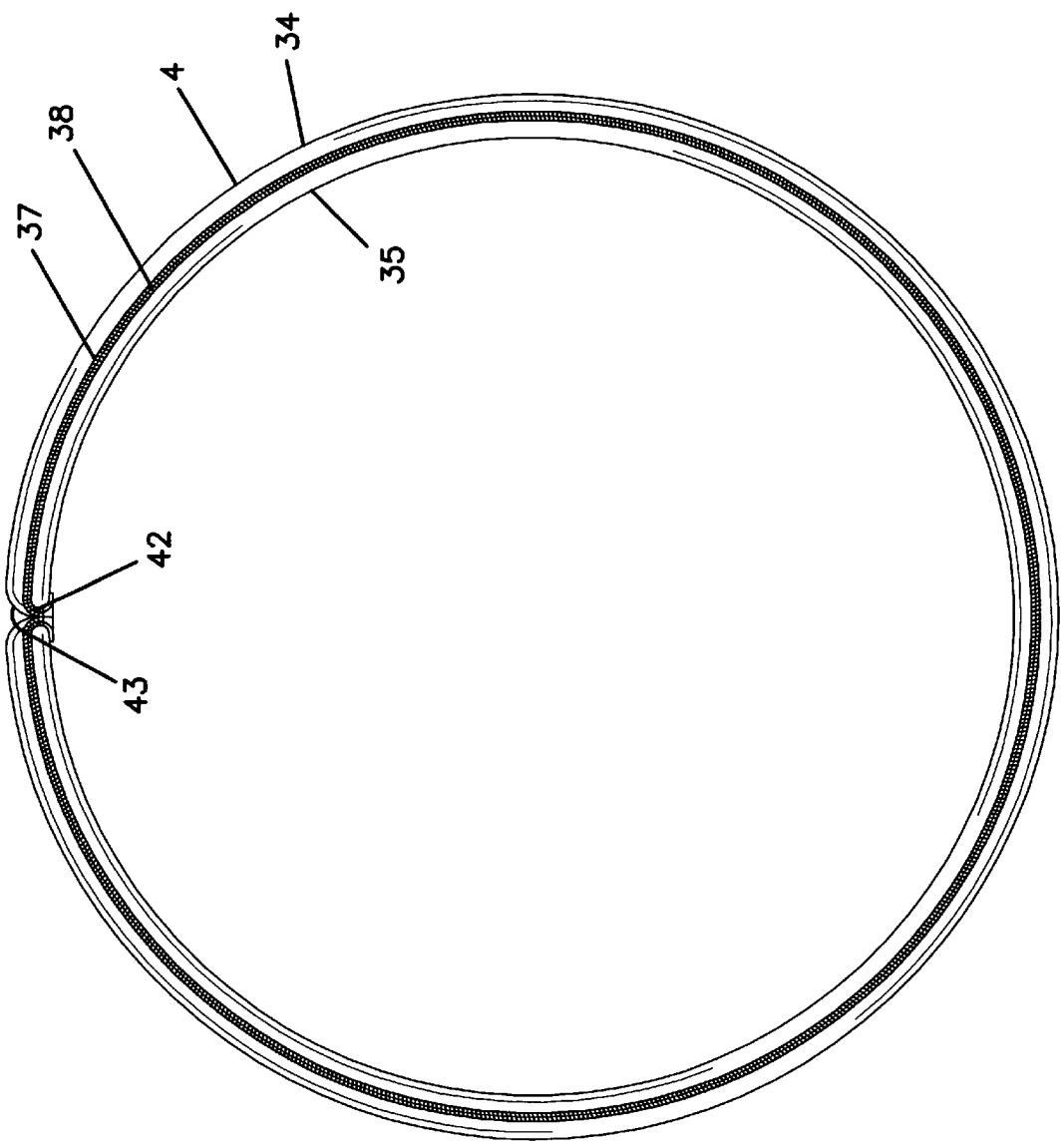
FIG. 4 is a top plan view of a prefilter component of the arrangement shown in FIGS. 1–3.
Figure 5:
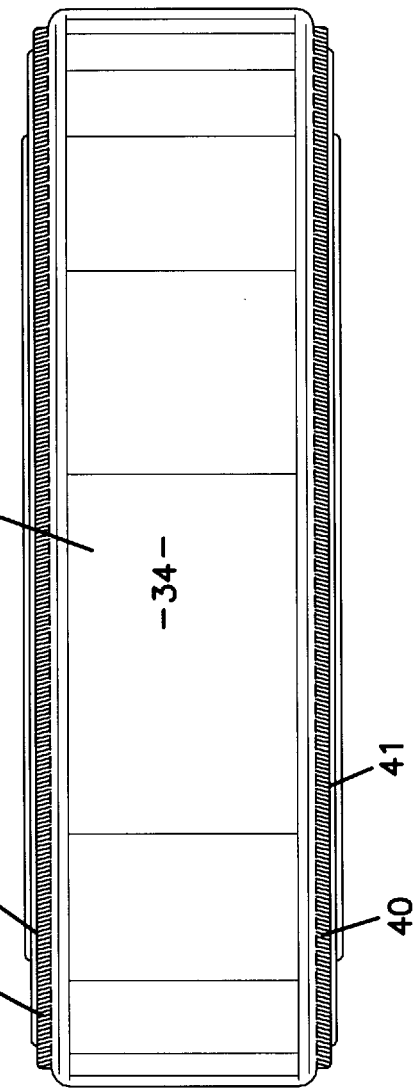
FIG. 5 is a side elevational view of the component shown in FIG. 4.
Figure 6:
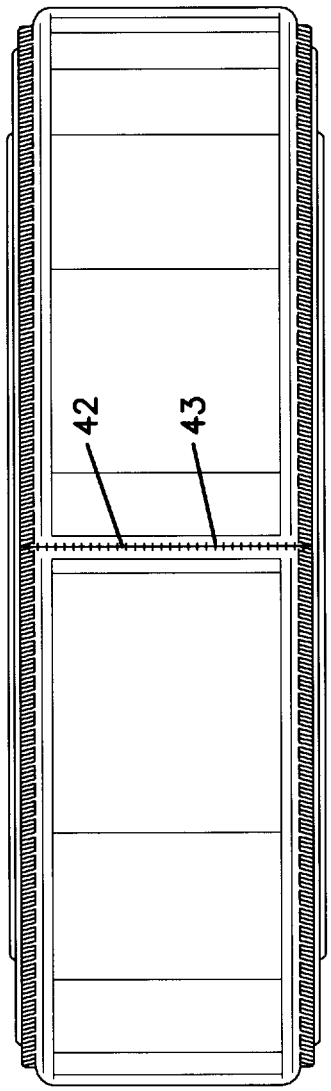
FIG. 6 is a side elevational view of the component shown in FIGS. 4 and 5.

Herein the outer liner 16 will generally be referred to as defining the outer surface or periphery 28, FIG. 3, of element 5. For many arrangements according to the present invention, this outer surface, especially when utilized with light trucks or automobiles, will have an area of about 90 sq. in. to 950 sq. in., i.e., about 590–6130 sq. cm. The term "area", in this context, is meant to refer to the height or transverse dimension of liner 16 (between points A and B, FIG. 3) multiplied by the outer circumference of the filter element 5, typically defined by a circular edge of liner 16.

Of course, this outer periphery or area is not necessarily a measurement of the media upstream surface area, of filter 5. The upstream surface area of the air filter 5 may be the same as the outer peripheral area defined in the previous paragraph, depending on the nature of the design. If the most upstream air filter media in air filter 5 is a typical, conventional, depth media, the upstream surface area (including open space) of this media will generally be about the same as the outer peripheral area defined above. However, if the most upstream media in the air filter 5 is a pleated media, its upstream surface area will be substantially larger than the outer peripheral area described above, for the air filter 5. A reason for this is that the pleats increase the upstream surface area of the media. In typical constructions, utilized in light trucks or automobiles, the surface area of the upstream surface of the media, when pleated media is used, will typically be about 10 sq. ft. to 75 sq. ft. (i.e., about 0.9–7 sq. m.) based on a pleat depth of about 0.5 inch (about 1.25 cm) to 2.5 inch (about 6.35 cm), and a pleat population of about 8 to 14 per inch (3–6 per cm) around the inner periphery. Such pleat depths, and such a range of pleat population, is typical for light vehicles. (Generally for the size of filter utilized in light vehicles, if greater than 14 pleats per inch (6 per cm) are used around the inner periphery, the pleats are undesirably tight; and, if less than about 8 pleats per inch (3 per cm) around the inner periphery are used, insufficient use has been made of the volume, for efficient long time filtering.)

For many applications of the present invention, the primary air filter 5 will be substantially unchanged from a conventional construction. Indeed, it may comprise an already existing part of a design that has previously been used. In use, such arrangements are typically positioned in conventional circular housings, with a space or distance of about 0.25 to 0.75 inches (0.6 cm–2 cm) existing between the outer liner 16 and a circular sidewall 74 of the housing, the space being shown at 79 in FIG. 8, when the conventional system is assembled. According to the present invention, the prefilter 4 is sized and configured to fit within that space, in a convenient manner, to increase filter efficiency and filter life time. Thus, prefilters according to the present invention can be retrofit into existing filter arrangements, if desired. Of course, the principles can be applied to newly designed systems. Hereinbelow, some examples of arrangements that can be retrofit according to the present invention are provided.

Herein, the term "filter lifetime" and variants thereof, refers to the lifetime of ordinary intended use of a filter element or assembly, without need for change or modification, and without regeneration of the media. Filter lifetime is generally measured by reference to a time period until there has occurred a build up of some defined pressure differential across the filter, as a result of particulate load on the filter. In typical systems involving automobile and light truck engines (class 5 trucks and smaller), ordinary filter lifetime will be the period in which the system can be operated without an increase in pressure differential across the filter element of greater than about 10 inches of water (25 cm of water) above the original pressure differential measured for a new, clean element in the system. In typical such systems, the pressure differential across a filter arrangement, under engine load, will be about 7" to 17" of $H_2O$ (i.e., about 17–43 cm of $H_2O$). In larger trucks, class 6 on up, filter lifetime is generally measured as being the time in which the restriction across the system reaches 25 inches of water (i.e., about 64 cm of $H_2O$). When reference to pressure differential across "the system" is made, the reference is typically to the measurement of the pressure differential from ambient, to the clean air outlet of the air filter system.

It is generally preferred to provide a system which has a desirable level of filter efficiency with as long a lifetime as reasonably possible. In general, techniques according to the present invention can be utilized to increase filter lifetime of otherwise conventional systems, through the utilization of the prefilter. In some instances the prefilter 4 can even be utilized to increase filter efficiency.

In the assembly depicted in FIGS. 1 and 2, air filter 5 is provided with prefilter 4 positioned therearound. The prefilter 4 comprises a covering or sheath 25 of filter media 26 which is positioned circumferentially around air filter 5, in a generally covering relationship to upstream side 28 thereof. Upstream side 28 of filter 5 is generally the outer peripheral area or side defined by outer liner 16, upstream of filter media 12; i.e., it is the side or surface through which air to be filtered is passed.

In general, for preferred arrangements the covering 25 of depth media comprises at least two layers of media. In preferred systems, the prefilter comprises two layers of media which differ from one another. For the particular embodiment shown, the covering 25 comprises two layers of media 34 and 35, FIG. 2. Layer 34 comprises the outer layer or most upstream layer; and, layer 35 comprises an inner or more downstream layer of media. Referring to FIG. 2, in covering 25, layers 34 and 35 are secured to one another. In the particular embodiment shown, the method of securing comprises a first row of stitching 37 along a first peripheral side edge 38 and a second row of stitching 40 along a second peripheral side edge 41. In the arrangement depicted, prefilter 5 is formed from a strip, comprising media layers 34, 35, which has been sewn into a circular configuration by stitching 42 at transverse seam 43, FIG. 3. Herein the term "transverse" in connection with defining the seam in a circular arrangement, refers to a seam which is directed transversely to a circular dimension of the media in the prefilter 5. In this instance, the "transverse" direction is the direction generally parallel to a central longitudinal axis of the cylindrical arrangement and extending between the opposite, circular, edges of the prefilter 4.

For the particular preferred arrangement depicted, upstream layer 34 comprises a non-woven fibrous depth media; and, downstream layer 35 comprises an open cell foam media. For one particular embodiment, the outer layer 34 of depth media would comprise, for example, polyester fibers; and the inner layer 35 will comprise, for example, polyurethane foam. The stitching for such an arrangement could comprise, for example, any sufficiently strong thread or cord, typically applied as a surge stitch. The preferred arrangement shown does not have any upstream or downstream liner attached to the prefilter 4.

In preferred arrangements, each of layers 34 and 35 comprises "depth" media. The term "depth" in this context refers to a media which, during filtering, traps particles generally within, and at least partially throughout, its depth, rather than principally on its outer surface. Both fibrous media and open cell foam media are well known forms of depth media. These are distinguished from well known surface loading media such as conventional pleated paper (cellulose) media. It is noted that the media 12 within air filter 5 may comprise either a surface loading media or a depth media, or a combination of both. Typically, however, prefilter 4 will not be preferred unless it comprises only layers of depth media.

In general, when at least one of the layers (34,35) of depth media comprises an open cell foam such as a polyurethane foam, the prefilter 4 will be relatively strong and durable. It may also be constructed to possess some elastic character, due to the somewhat rubbery or elastic nature of foam, so that it can be stretched over filter 5. If it is appropriately sized, it would then snugly secure itself against filter 5. It is not necessary that the prefilter 4 cover the second filter 5, without any possible region of non-coverage, since the prefilter 4 will provide its filtering function quite well, even if some small portions of no coverage, along edges for example, do occur. However, preferably prefilter 4 is sized to cover at least 90%, more preferably at least 95%, and most preferably at 100%, of the open surface area 28 along outer liner 16 through which air will pass during filtering.

In use, an arrangement constructed such as that shown in FIGS. 1 and 2 will be provided with relatively long life, by comparison to conventional elements without the prefilter. The prefilter 4 will allow for a substantial loading of particulates, with a generally slower rate of increase in pressure differential across the filter element. This is because the prefilter 4 is generally depth media, and capable of high load and relatively good efficiency, without an undesirably rapid increase in pressure differential. The filter media of the second filter 5, then, will serve to provide an efficient downstream filter for protection against engine damage, due to particulate material that may either bypass prefilter 4 or simply pass through the prefilter 4.

It is anticipated that in typical constructions, involving the preferred materials identified herein and used with truck engines or automobile engines, at least about 10% and typically about 40% to 60%, by weight, of the particulate material loaded onto the overall filter arrangement 1 during normal use, will be loaded onto the prefilter 4, with the remainder being loaded on the second filter 5, both at any selected point after substantial use, and also at filter lifetime. By "substantial use", it is meant that the use has been long enough to lead to significant loading of particulates, typically reflected by a pressure differential increase across the filter element or system of at least about 2" (i.e., at least about 5 cm).

In a typical embodiment, such as that shown, end caps 10 and 11 will comprise conventional plastisol end cap material, such as that commercially available from Dennis Chemicals, St. Louis under the designation 9188-2, molded in a conventional manner to a Durometer of at least about 54, Shore A. The filter media 12, of the filter 5, may comprise conventional pleated paper (automotive) filter material; however, other materials may be selected. It is anticipated that if appropriately configured, the prefilter 4 may be utilized to improve the performance of a filter element such as air filter 5, when any of a variety of specific materials are utilized as the media 12 in the air filter 5.

It is foreseen that, in some applications, prefilters according to the present invention can be utilized in association with large drum-shaped filter elements, such as used in larger vehicles, i.e., light trucks and larger. Such filters typically have an outside diameter of at least 6 inches, i.e., about 15 cm (up to about 25 inches, i.e., about 64 cm), and a height of at least 8 inches, i.e., about 20 cm (up to about 20 inches, i.e., about 51 cm). In many systems, such arrangements comprise filter elements having: one open end cap, with a central aperture; and, one closed end cap. The closed end cap generally completely closes one end of the cylindrical structure to air flow passage therethrough; that is, it has no central aperture. The open end cap, of many such systems, is provided with a radial seal construction for sealing the element to an outlet tube. Such filter elements may comprise a variety of materials, including depth media or pleated media. Prefilters generally described hereinabove, but sized to fit such arrangements, can readily be prepared. Drum filters utilizing radial seals are described, for example, in U.S. Pat. Nos. 4,720,292; 5,423,892 and 5,082,476. The end caps preferably comprise soft, elastomeric polyurethane as described in U.S. Ser. No. 08/551,898 and U.S. Ser. No. 08/371,809. The complete disclosures of 4,720,292; 5,423, 892; and 5,082,476; and also U.S. Ser. Nos. 08/371,809 and 08/551,898 are incorporated herein by reference, in their entirety. It is noted that drum filters can be configured with axial seals, and that prefilters according to the present invention may also be used with such arrangements.

Figure 7:
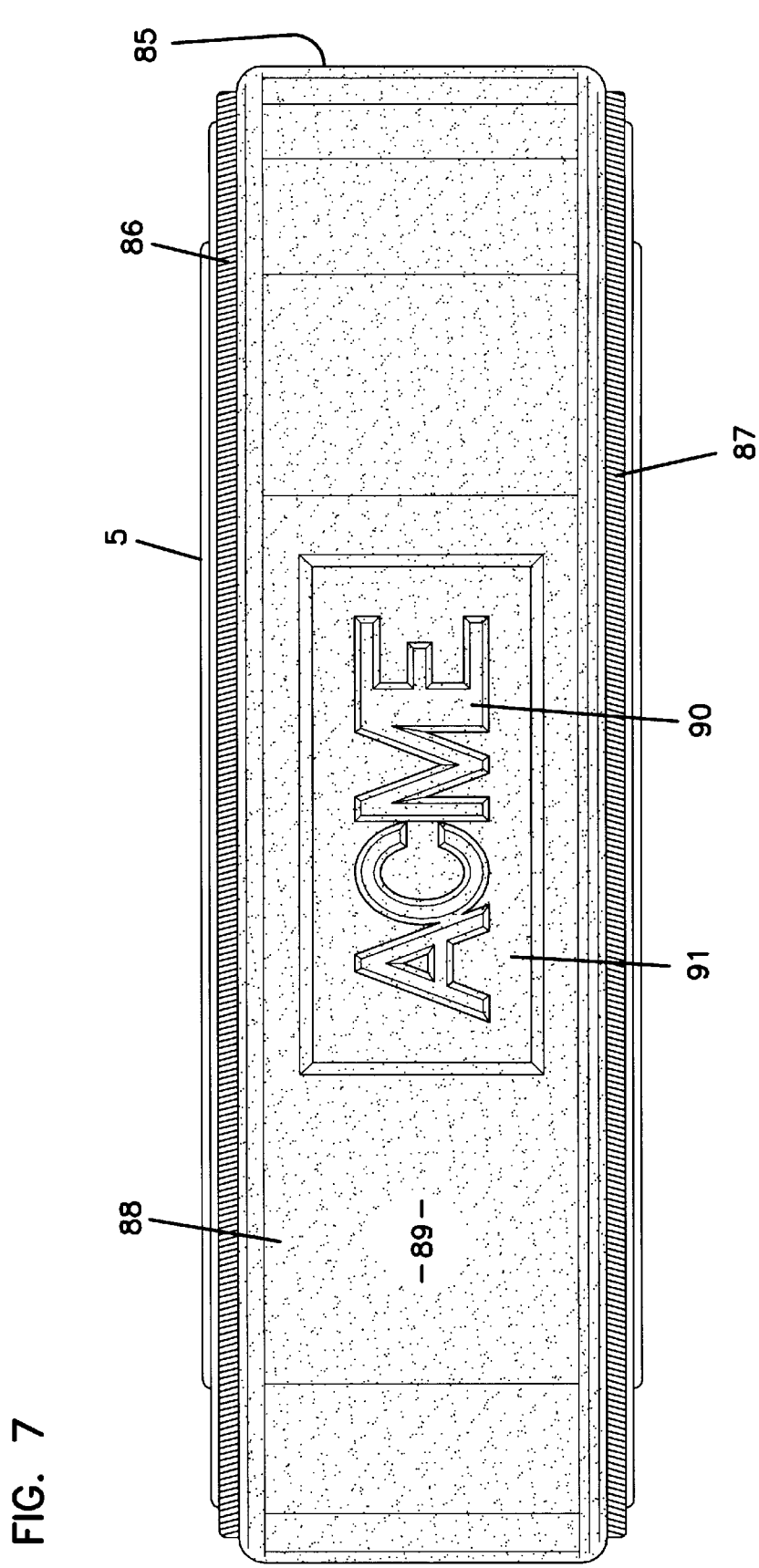
FIG. 7 is a side elevational view of an optional form of the component shown in FIGS. 4–6.

Attention is now directed to FIG. 7. FIG. 7 is a side elevational view of a particular prefilter 85, according to the present invention, depicted positioned around a filter 5. Peripheral edge seams 86 and 87 are depicted. The prefilter 85 includes, as an outer layer of media therein, fibrous depth media 88.

In the version of FIG. 7, an outer surface 89 of depth media 88 has been "branded" or "embossed", to depict indicia 90. For the particular arrangement as shown, in region 91 the fibrous media 88 has been compressed, leaving indicia 90 as raised area. The compression can be caused using pressure and heat, since fibrous media of the type from which such a media layer 88 will typically be formed, is readily compressible and deformable. When the media generally comprises polyester fibers of about 12–40 microns diameter, branding or embossing can be accomplished by pressing a heated platen, at a temperature of about 300° F. (about 150° C.), into the depth media and holding it there, for up to about 15 seconds. The amount of pressure need only be enough to "bottom" the platen on the media. Typically, the platen will be an aluminum or steel embossed piece, with a Teflon® or similar coating, at least on the side which engages the fibers. Of course the indicia may comprise information, trademark designations, decoration or serve any of a variety of other purposes. In general, however, in regions 91, where the outer portion 89 of layer 88 has been compressed or embossed, the outermost surface is no longer as efficient and effective as filtering media. Thus, the amount of surface area which has been "branded" or "embossed" will generally be chosen to be only a small portion of the overall surface area 89. It has been found that up to at least about 5% of the media surface 89 can be embossed or branded, without substantially undesirably affecting prefilter operation, in a typical construction 85.

In those preferred embodiments in which the prefilter comprises an outer layer of fibrous media and an inner layer of foam media, the outer layer of fiber media may be considered as a "particle impactor" media. That is, it is the media which particles carried by an air stream will tend to first encounter. It will typically be a "high velocity" impact media, since the particles will have lost momentum as a result of collisions with the fibers in the outer layer, before they reach the inner layer. That is, particles which become trapped in the inner foam layer, of the prefilter, or even in the downstream air filter, will typically have had their velocity or momentum reduced, as a result of collisions with the outer layer of fibrous media. This can be highly advantageous, since it can facilitate efficient operation of the system.

II. An Alternate Embodiment: FIGS. 9–13

Certain principles according to the present invention may be applied in alternate filter constructions. For example, some may be applied in panel filters. An embodiment demonstrating this is illustrated in FIGS. 9–13.

Figure 9:
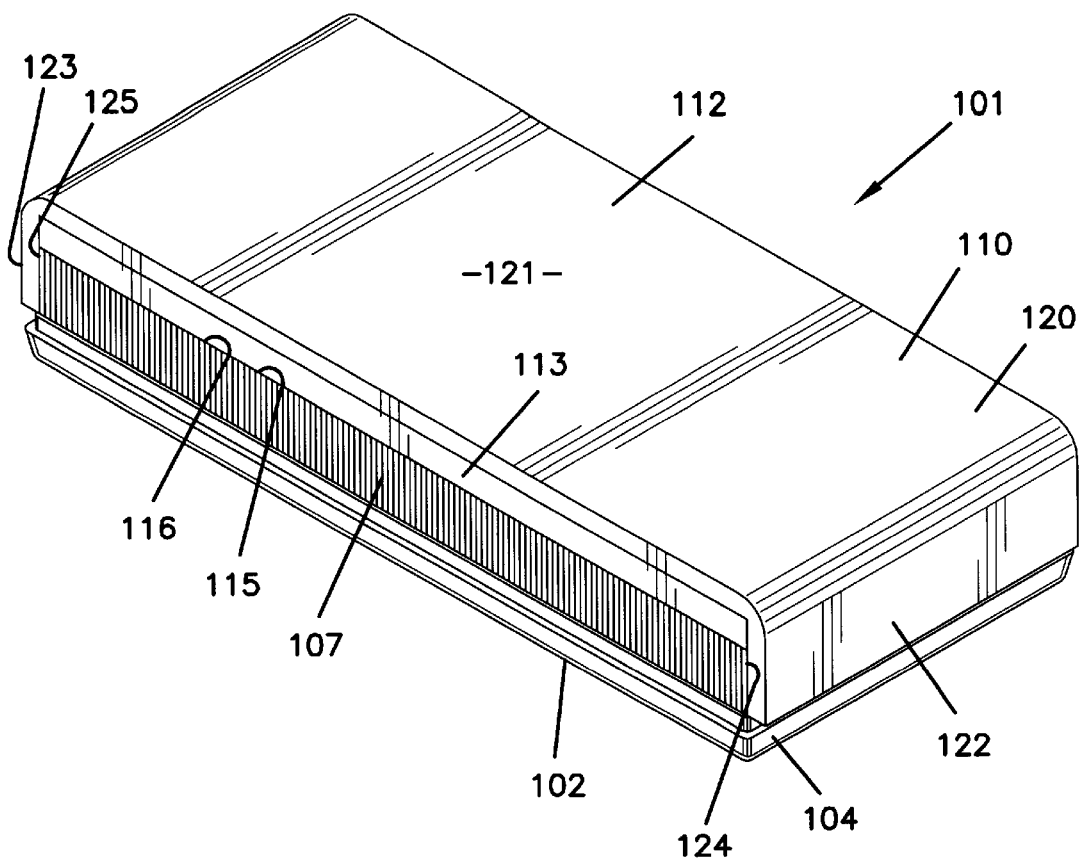
FIG. 9 is a perspective view of an alternate embodiment of a filter arrangement according to the present invention.
Figure 10:
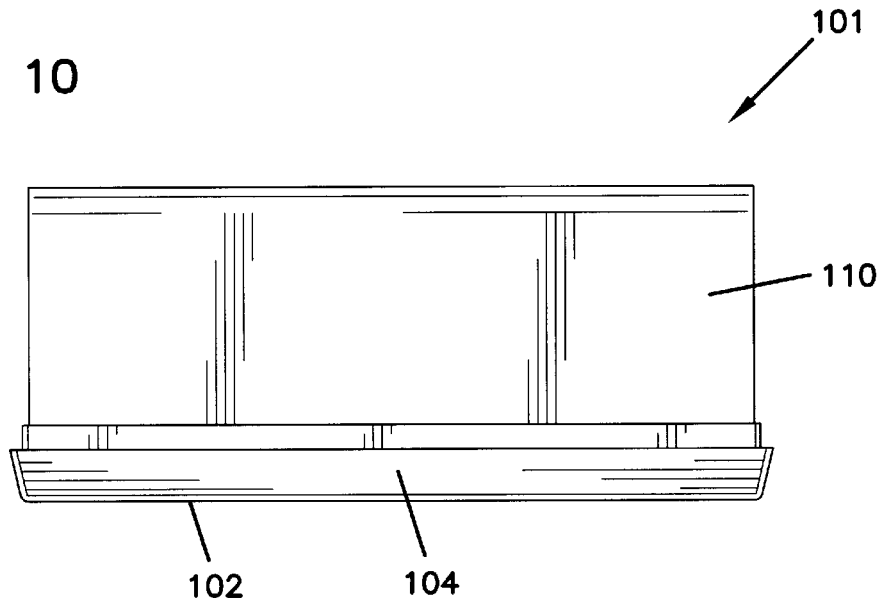
FIG. 10 is an end elevational view of the arrangement depicted in FIG. 9.
Figure 11:
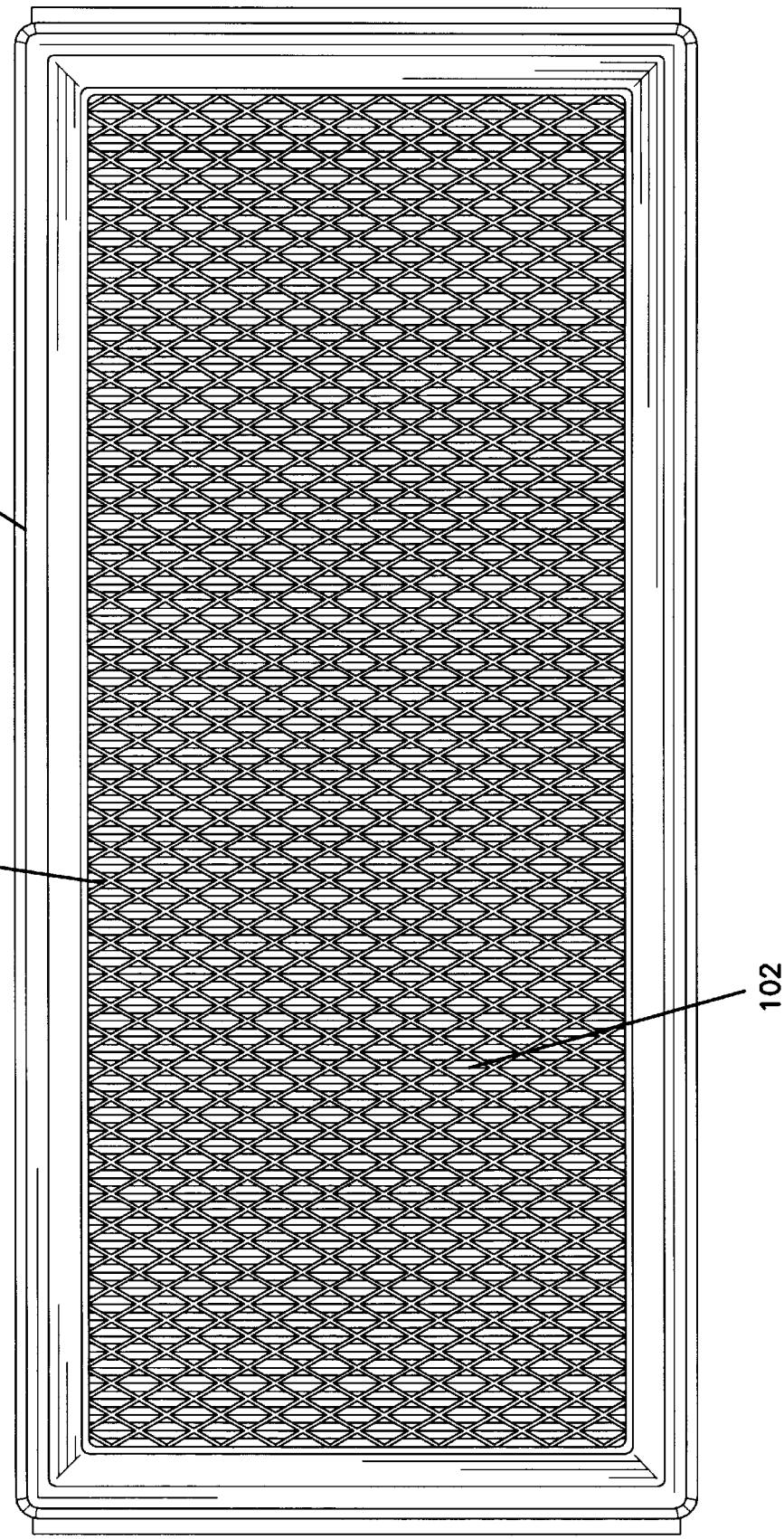
FIG. 11 is a front plan view of the arrangement shown in FIGS. 9 and 10.

Referring to FIG. 9, a panel filter construction is depicted generally at reference numeral 101. Panel filter construction 101 includes a most downstream surface 102 provided with an end cap and sealing rim 104. Along downstream surface 102, panel filter 101 includes a liner 105, FIG. 11. For the embodiment shown, the liner 105 comprises expanded metal, having an open area of at least 50% and preferably at least about 70%.

Referring again to FIG. 9, behind liner 105, panel filter 101 includes, in a conventional manner, pleated filter material 107. The pleated filter material 107, for preferred embodiments, will comprise a pleated paper material, pleated synthetic material, or a pleated composite. The material may comprise, for example, a standard cellulose automotive filter media. In the arrangement shown, the pleats of pleated media 107 are edge sealed or "closed." That is, each pleat comprises two panels which are secured closed to one another, folded and/or bead sealed, so that air cannot pass around the panels and bypass filtering. This is a conventional approach for panel filters.

Figure 12:
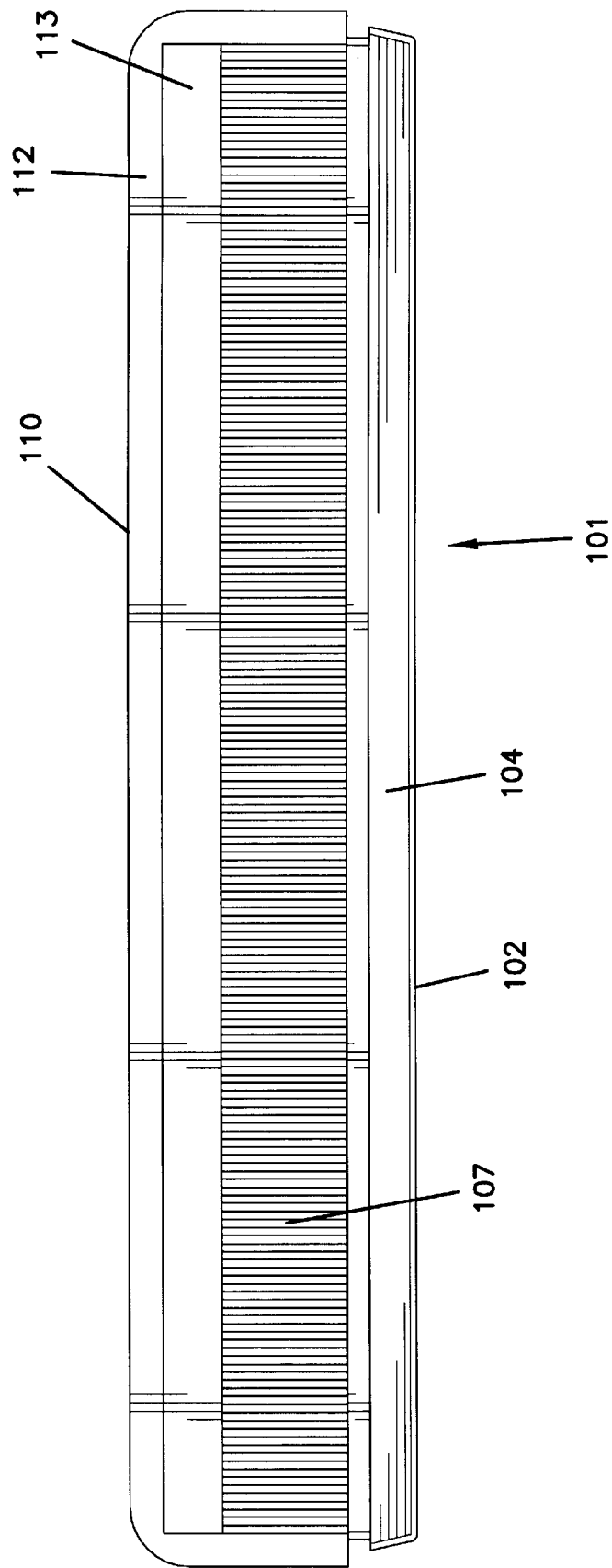
FIG. 12 is a side elevational view of the arrangement shown in FIGS. 9–11.

Referring to FIG. 12, panel filter 101 includes a prefilter construction 110 positioned upstream of the pleated filter material 107. The prefilter construction 110 includes multiple layers of depth media, preferably at least two layers differing in construction from one another. For the particular arrangement shown, prefilter construction 110 includes a first layer 112 of depth media and a second layer 113 of depth media. The first layer 112 is a most upstream layer, and is the layer through which the air is first filtered, as it passes through the panel filter 101. Layer 113 is a more downstream layer, in the prefilter construction 110, and is positioned between the first layer 112 and the pleated filter media 107, at least in certain preferred locations.

Referring to FIG. 9, for the preferred embodiments shown, the second layer 113 preferably comprises a sheet of foam media, for example polyurethane foam, positioned along pleat tips 115, on an upstream side 116 of pleated filter material 107.

Figure 13:
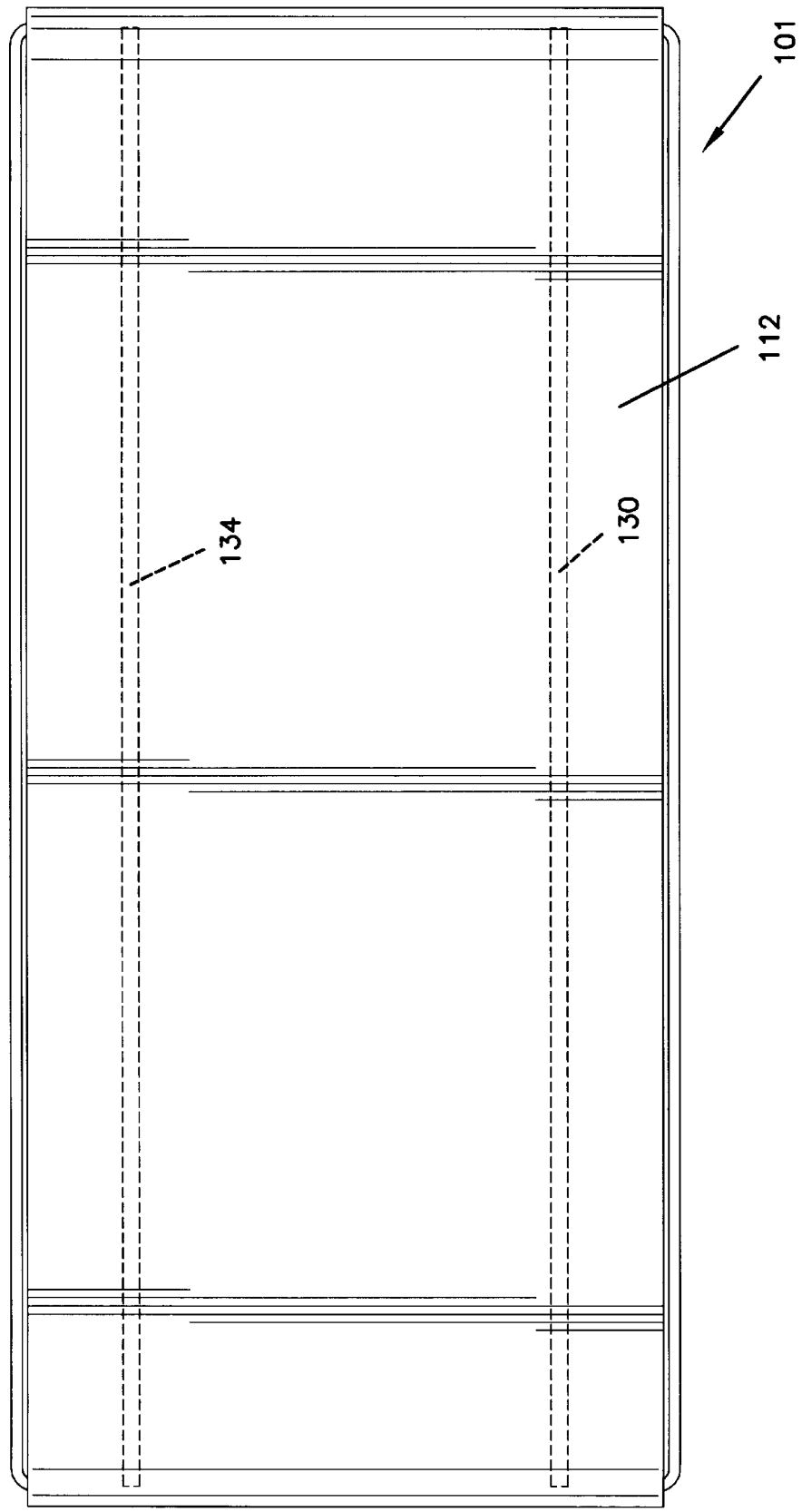
FIG. 13 is a back-side plan view of the arrangement shown in FIGS. 9–12, with phantom lines indicating a portion hidden from view.

For the embodiment shown, layer 112 comprises a sheet of fibrous depth media, for example non-woven fibrous depth media, fit over the sheet of foam 113. Referring to FIG. 9, the sheet 120 of fibrous media includes overlapping surface 121 and end flaps 122, 123. Overlapping surface 121 fits snugly over sheet 113 of foam material. End flaps 122, 123 fit along edges 124, 125 of sheet 113 and pleated filter material 107. Referring to FIG. 13, glue lines 130, 134 secure sheet 113 to the pleat tips 116. Similar glue lines (not shown) can be used between sheet 113 and sheet 112.

It can be seen, from a review of FIGS. 9–13, that panel filter 101 has a somewhat analogous construction to arrangement 1, FIGS. 1–8. Air to be filtered generally first passes through layer 112. For the most part, it will pass through second layer 113 before entering pleated filter material 107. Along the end folds 122, 123, some air will pass directly from the first layer 112 into the pleated filter material 107, without passing through the second layer 113. cl Preferred Constructions In the following discussion, some preferred constructions are provided, for utilization in certain applications. From these descriptions, more general applications of the invention will be apparent.

In many applications, the prefilter will be designed as a retrofit for already existing commercial filter products and vehicles. That is, the vehicle already has a housing and cylindrical filter element, or a panel filter and housing, in its air filter assembly. When the system is a cylindrical filter, according the present invention, a prefilter would be provided, to slip around the outer periphery or circumference of the air filter, circumscribing same. The prefilter would fit in the housing in a space between the outer periphery of the pre-existing cylindrical filter, and the wall of the housing, as shown in FIG. 8. As a result of the provision of prefilter, an overall assembly having improved filter performance and lifetime is provided.

Typically, the distance between the cylindrical filter element 5 and the housing wall will be about 0.5 inch (1.25 cm) to 0.75 inches (about 2 cm), in conventional systems without the prefilter 4. In some constructions, when installed, the prefilter 4 will almost completely fill the space. In others, the prefilter will in fact fill the space and be compressed slightly. In still others, there will be some space left between the prefilter and the housing wall.

For the systems described, preferred prefilters comprise a layer of foam depth media having a layer of fibrous depth therearound.

The foam media may comprise a variety of polymers, but polyurethane will generally be the preferred foam media due to its availability and its predictable characteristics. Generally, a foam material having a cell density of at least 30 pores per inch (11 pores/cm), and not greater than about 80 pores per inch (32 pores/cm), will be preferred. A reason is that when the cell density is below about 30 pores per inch, the foam is so open and permeable, that it is not very efficient as a filtering material. However, when the cell density is greater than about 80 pores per inch, the filter pores are typically so small they tend to plug easily, with a concomitant reduction in filter lifetime. The most preferred polyurethanes presently identified for use in arrangements according to the present invention have a cell density of about 50 to 55 pores per inch (19–22 pores/cm). The term "pores per inch" as used herein refers to the number of pores encountered in a linear direction, on the surface of the foam material, over the distance identified. It is a conventional term for designating foam.

In general, urethane foams according to the present invention should preferably be finished foams or "quenched"
foams. Foam materials having the appropriate density and finish can be readily obtained from foam suppliers such as Foamex of Philadelphia, Pa.

The thickness of the foam will be selected depending upon the particular use involved. For a typical vehicle panel filter, a foam layer having a thickness of about ½ inch (1.25 cm) will typically be usable and preferred. With circular light vehicle filters, foam thickness of about ¼ inch (0.64 cm) will typically be preferred.

Also, in preferred systems, the outer or most upstream layer of media in the prefilter comprises a fibrous depth media. Preferably, a media comprising polyester fibers is used. In general, conventional media can be used. Typical fibrous depth media usable will comprise either a blend involving a range of fiber sizes, or a uniform fiber size. Some typical, commercially available, conventional blends use a range of fibers, generally within the range of 12 microns to 40 microns. A usable, commercially available, uniform fiber material, described hereinbelow, has a fiber size of about 12.5 microns.

With typical preferred blends, the average fiber size should be within the range of about 15–30 microns, typically about 20 microns.

A usable fibrous depth media material is KemWove 4.2 ounce, available from KemWove, Inc. of Charlotte, N.C. 28241. The material is described in U.S. Pat. No. 5,423,892, incorporated herein by reference. This material has a basis of weight about 4.2 ounces per square yard, and can be obtained at a thickness, free state, of about ½ inch. The average fiber size is about 20 microns, and the material exhibits a permeability (Fraser test) of at least 500 feet per minute minimum.

Similar materials, also usable, can be obtained from a variety of other suppliers, such as Fiberbond Inc., of Michigan City, Ind.

In some instances, a more open fiber material will be desired. One such material is KemWove 8643, also available from KemWove. The material is described in U.S. Pat. No. 5,423,992, incorporated herein by reference. The material has a basis weight of about 3.1–3.8 oz./yd.$^2$, and average free state thickness of about 0.32–0.42 inches. It has a minimum permeability of about 370 ft./min. and comprises an average fiber size of about 12.5 microns.

In general thicker (½ inch) fibrous material would be preferred for constructions involving panel filters, so that the overall prefilter thickness would be about ½ inch; and, the thinner more open material, for example KemWove 8643, will be preferred in the circular, automotive, filters wherein the overall prefilter thickness is about ⅜ inch (i.e., about 0.95 cm).

Herein the term "face velocity" refers to the velocity of air required to induce a 0.5 inch (i.e., about 1.25 cm) water restriction using a Frazer permeability testor.

Herein the term "free state" when used in reference to a characteristic of filter media, refers to a characteristic of the material from which the prefilter 4 is made, prior to being incorporated into the prefilter 4. For example, free state thickness of the foam from the supplier, or the free state thickness of the fibrous depth media from the supplier. It will be understood that during construction of prefilter 4, each of the layers may be compressed somewhat. Some level of compression may even be desired in certain systems, in order to increase the density (or percent solidity) of the filter media and thus its efficiency.

The size of the two layer strips will be defined by the filter element it needs to fit around. For a typical automotive or light truck air filter having an outside diameter of about 30 cm, and a height of about 8 cm, the two layer strip will preferably be made about 95 cm×8 cm, with the layers sewn to one another along outer longitudinal edges by a surge stitch using a strong thread or cord. The strip can be sewn into a circular ring pattern by a transverse seam, using a similar stitch. The number of stitches per inch along any of the sewn seams does not appear critical, as long as it is sufficient to ensure structural integrity. Preferably the transverse seam is first made, and the system is turned inside out, in use, as shown in FIG. 3. Such an arrangement will snugly fit around the outer perimeter of the circular (or oval) air filter, and will be sized to fit within the housing between the air filter and housing wall.

A construction of about the above type would be usable, for example, to improve the filter performance of the following vehicles:

Air filter (round) used on Buick Skylark 4 cylinder 1.8 liter with throttle body fuel injection; Century and Skylark with 4 cylinder 2.5 liter with throttle body fuel injection; Chevrolet Camaro, Celebrity and Citation with 4 cylinder 2.5 liter with throttle body fuel injection; Oldsmobile Cutlass Cierra and Omega with 4 cylinder 2.5 liter with throttle body fuel injection; Pontiac J2000 4 cylinder 1.8 liter with throttle body fuel injection; Firebird, Phoenix and 6000 with 4 cylinder 2.5 liter with throttle body fuel injection, (Replaces: AC p/n A785C);

Air filter (panel) used on Buick Skylark, Chevrolet Citation, Oldsmobile Omega, Pontiac Phoenix with V6 173, (Replaces: AC p/n A735C; GMC p/n 8996555);

Air filter (round) used on Buick, Chevrolet, Chevrolet trucks, GMC trucks, Oldsmobile, Pontiac, (Replaces: GMC p/n 6484235, AC p/n A348C);

Air filter (round) used on Buick, Chevrolet Corvair, Chevrolet, Chevrolet trucks, GMC trucks, Oldsmobile, Pontiac, (Replaces: GM p/n's 6419892, 6420934, AC p/n A178CW);

Air filter (round) used on Buick, Chevrolet Corvair, Chevrolet, Chevrolet trucks, GMC trucks, AMC Jeep, Oldsmobile, Pontiac, (Replaces: GMC p/n 6483645, AC p/n A329C);

Air filter (round) used on Chevrolet cars and trucks with V6 229 and V8 267 engines, (Replaces: AC p/n A773C);

Air filter (round) used on Ford, Ford trucks, Lincoln Mercury, (Replaces: Ford p/n's D2AF-9601AA, D2AZ-9601A; Motorcraft p/n FA-97);

Air filter (panel) used on Audi 4000, 4000S, Fox, Volkswagon Daher, Jetta, Quantum, Rabbit, Scirocco and pickup truck; Chrysler products with 4 cylinder 2.2 liter, throttle body fuel injected and multi-port fuel injected engines; Ford Escort 4 cylinder 1.6 liter turbo, 1.9 liter electronic fuel injected, (Replaces: Chrysler p/n's 4241042, 4342800; Ford p/n E4FZ-9601A; Motorcraft p/n's FA-1031, FA-999);

Air filter (panel) used on Buick Lesabre and Riviera V6 3.0 liter multi-port fuel injection; Electra, Lesabre and Riviera with V6 3.8 liter with sequential fuel injection; Oldsmobile, Delta 88, Royale, Toronado and Ninety-Eight with V6 3.0 and 3.8 liters with sequential fuel injection, (Replaces: GM p/n 25095333 and AC p/n A974C);

Air filter (panel) used on models without carbon type filter; Dodge Aries K, Plymouth Reliant K, Dodge Omni, Plymouth Horizon with 2.2 liter engine, (Replaces: Chrysler p/n's 4227087, 4342801);

Air filter (panel) used on Ford Taurus, Aerostar, Mercury Sable 4 cylinder and V6, (Replaces: Motorcraft p/n FA 1043, Ford p/n ECAZ-9601B);

Air filter (round) used on Dodge, Dodge trucks, Plymouth and American Motors, (Replaces: Chrysler p/n 1739547, AMC p/n 8992661);

Air filter (round) used on Ford Fairlane, Fairmont, Granada, LTD, Maverick, Mustang, Pinto, Thunderbird, light trucks, Bronco, Ranchero, Mercury Bobcat, Capri, Comet, Cougar, Marquis, Montegro, Toyota Celica, Corona, Cressida and Hi-Lux pickup, (Replaces: Ford p/n D4ZZ-9601AA; Motorcraft p/n FA-584R);

Air filter (panel) used on Ford Bronco, pickups and vans; Except 7.3 liter diesel, 6 cylinder 4.9 liter fuel injected Bronco and 5.0 liter four barrel carbureted and fuel injected, (Replaces: Motorcraft p/n FA-1046);

Air filter (panel) used on Ford Mustang, Mercury Cougar, (Replaces: Ford p/n's D3ZF-9601AA, D3ZF-9601A; Motorcraft p/n FA-574);

Air filter (panel) used on Ford Falcon, Mustang; Mercury Comet, American Motors, (Replaces: Ford p/n C5ZZ-9601A, C1KE-9601A; AMC p/n 8991386; Studebaker p/n 1561842);

Air filter (panel) used on Mercury Topaz and Ford Tempo with 2.3 liter high swirl combustion engine, (Replaces: Ford p/n's E43E-9601CA, E43-9601CB; Motorcraft p/n FA-971);

Air filter (panel) used on Chevrolet S-10 and lazer, GMC S-15 and Jimmy with 4 cylinder 1.9 liter or 2.0 engine, (Replaces: AC p/n A826C; GMC p/n 25041542);

Air filter (oval) used on Ford Escort, Exp and Mercury Lynx, LN-7, (Replaces: Ford p/n E1FZ-9601A; Motorcraft p/n FA-713);

Air filter (panel) used on Ford pickup trucks with 5.0 liter V8 electronically fuel injected engine, (Replaces: Ford p/n E5TE-9601AB; Motorcraft p/n FA-1032); and Air filter (panel) used on Buick Skylark, Cadillac Cimmaron, Chevrolet Celebrity, Oldsmobile Firenza, and Pontiac 6000, With V6 2.8 liter multi-port fuel injected engines, (Replaces: GMC p/n 25043119; AC p/n A905C; Fram p/n A1098C).

As indicated above, in preferred arrangements according to the present invention, the prefilter comprises two layers, an inner layer of foam and an outer layer of fibrous depth media. In typical constructions, the fibrous depth media will be a more efficient filtering media than the foam media, thus certain preferred prefilters may have a "reverse" gradient, in theory.

In practice, however, such an arrangement may be preferred for a variety of reasons. For example, the foam construction adds strength and integrity to the system, and facilitates stretching and sliding over the filter element. It is less likely to be caught, as it encounters metal spurs or the like on an outer layer, as it is slid over the filter. Also, the foam will have some stretch or give, to facilitate a snug fit.

In addition, fibrous depth media can sometimes operate as an agglomerating filter. That is, it can collect very fine particles and agglomerate them as larger particles. In some instances these larger agglomerated particles may become knocked loose from the fibrous media. However, they would typically be trapped within the underlying foam media, in an efficient manner.

What is claimed is:

1. A filter arrangement comprising:
   (a) an inner air filter having:
      (i) first and second end caps;
      (ii) an inner and an outer liner extending between the first and second end caps; said outer liner having a first open surface area;
      (iii) cylindrical filter media between said inner and outer liners and potted within said first and second end caps;
   (b) a removable and replaceable filter circumscribing said inner air filter and covering said outer liner; said removable and replaceable filter covering at least 90% of said first open surface area of said outer liner;
      (i) said removable and replaceable filter comprising a ring construction of filter material including first and second layers of filter media secured together by stitching;
         (A) said ring construction having first and second, opposite circular rims;
         (B) said stitching including at least a first set of stitches along said first circular rim, and a second set of stitches along said second circular rim;
      (ii) said first layer comprising an outer layer generally surrounding said second layer;
         (A) said first layer being upstream of said second layer;
      (iii) said first layer of filter media comprising non-woven fibrous depth media; and
      (iv) said second layer of filter media comprising a layer of foam media including an open cell polyurethane foam having a cell density of 30 to 80 pores per inch.

2. A filter arrangement according to claim 1, wherein:
   (a) said stitching securing said first and second layers of filter media further includes a third set of stitches along a transverse seam extending between the first and second circular rims.

3. A filter arrangement according to claim 1 wherein:
   (a) said removable filter includes only two layers filter media.

4. A filter arrangement according to claim 1 wherein:
   (a) said first end cap is an open end cap having an axial seal bead thereon; and
   (b) said second end cap is an open end cap having an axial seal bead thereon.

5. A filter arrangement according to claim 1 wherein:
   (a) said inner air filter comprises a vehicle air filter constructed and arranged for filtering air at a flow rate of 200 to 400 cubic feet per minute therethrough, during normal engine operation with load.

6. A filter arrangement according to claim 1 wherein:
   (a) said inner air filter is circular and has:
      (i) an inside diameter with the range of 4 inches to 14 inches; and
      (ii) an outside diameter within the range of 5 inches to 25 inches.

7. A filter arrangement according to claim 1 wherein:
   (a) said first layer of filter media includes a fibrous depth media having an average fiber diameter within a range of about 12–40 microns.

8. A filter arrangement according to claim 1 wherein:
   (a) said cylindrical filter media comprises pleated paper filter media.

9. A prefilter construction for positioning around an air filter arrangement; said prefilter construction comprising:
   (a) a ring construction including an outer and an inner layer of filter media and first and second, opposite rims; said outer layer of filter media being secured to said inner layer of filter media with stitching;
      (i) said outer layer of filter media comprising non-woven fibrous depth media having an average fiber diameter size less than 40 microns;
      (ii) said inner layer of filter media comprising a layer of open cell polyurethane foam media having a cell density of 30 to 80 pores per inch;
      (iii) said stitching including first, second, and third sets of stitches:
         (A) said first set of stitches being along said first rim;
         (B) said second set of stitches being along said second rim; and
         (C) said third set of stitches extending between said first and second sets of stitches.

10. A prefilter construction according to claim 9 wherein:
    (a) said third set of stitches comprises a seam extending transversely across said ring construction.

11. A prefilter construction according to claim 9 wherein:
    (a) said outer layer of filter media includes an embossed portion.

12. A prefilter construction according to claim 9 wherein:
    (a) said ring construction has only two layers of filter media; said two layers together comprising said inner and outer layers of filter media.

13. A prefilter construction according to claim 9 wherein:
    (a) said ring construction is circular.

* * * * *